UNITED STATES PATENT OFFICE.

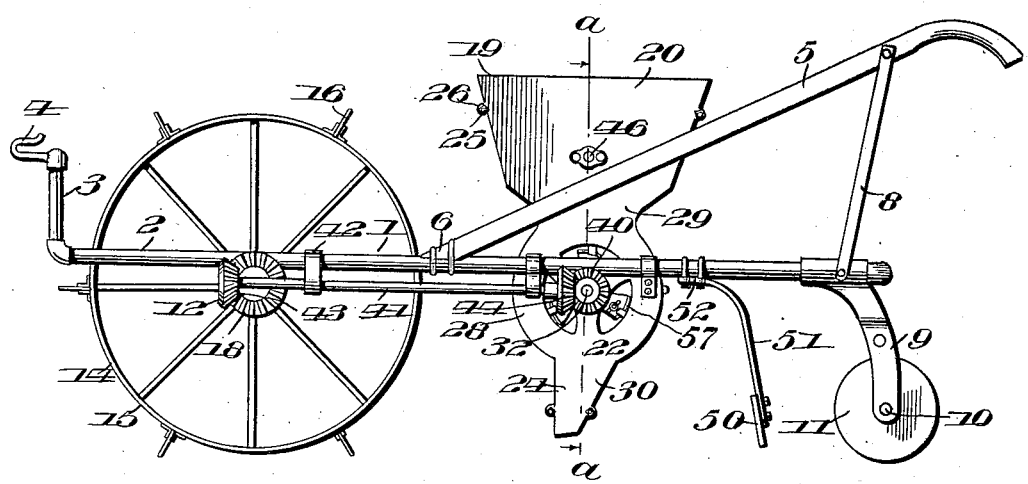
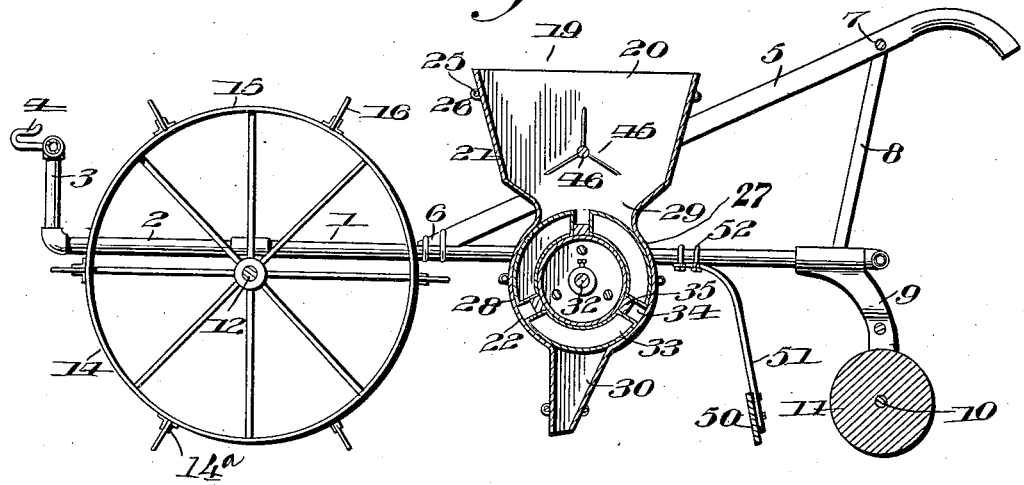

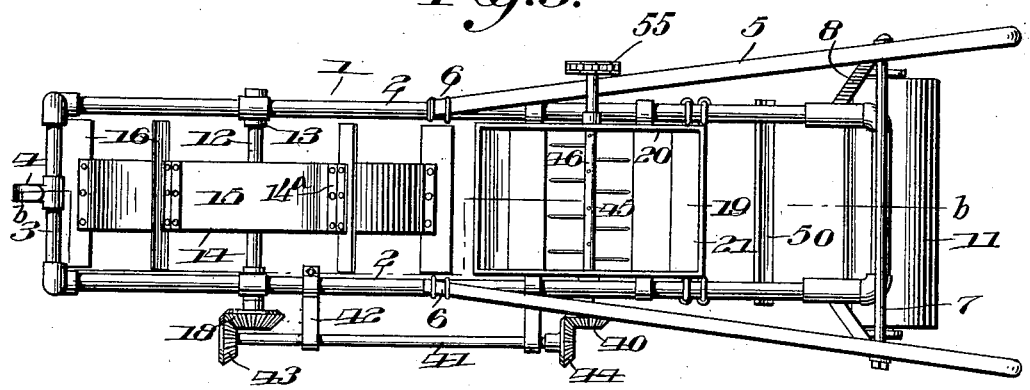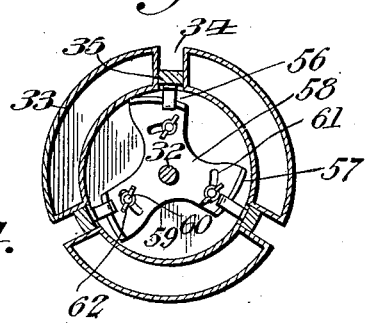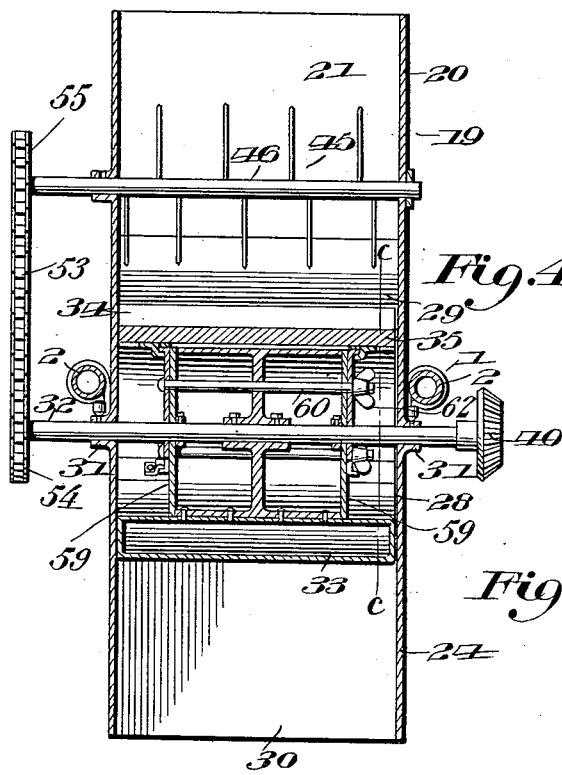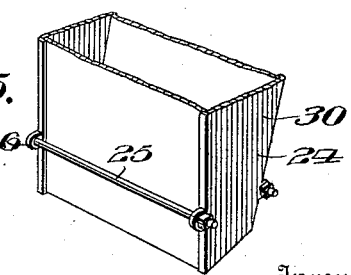

DONNIE C. GRAMLING, OF CARUTHERSVILLE, MISSOURI.

COTTON-PLANTER.

1,087,010.  Specification of Letters Patent.  Patented Feb. 10, 1914.

Application filed April 18, 1913. Serial No. 762,011.

*To all whom it may concern:*

Be it known that I, DONNIE C. GRAMLING, a citizen of the United States, residing at Caruthersville, in the county of Pemiscot and State of Missouri, have invented new and useful Improvements in Cotton-Planters, of which the following is a specification.

This invention is an improved cotton planter especially adapted for planting cotton in short drills across the cotton rows and thus avoid the necessity of chopping out the cotton rows in cultivating a crop, the invention consisting in the construction, combination and arrangement of devices hereinafter described and claimed.

In the accompanying drawings:—Figure 1 is a side elevation of a cotton planter constructed in accordance with my invention. Fig. 2 is a vertical longitudinal sectional view of the same, on the plane indicated by the line *b—b* of Fig. 3. Fig. 3 is a plan of the same. Fig. 4 is a vertical transverse sectional view of the same on the plane indicated by the line *a—a* of Fig. 1. Fig. 5 is a detail perspective view of the hopper spout. Fig. 6 is a detail sectional view of the seed dropping drum, on the plane indicated by the line *c—c* of Fig. 4.

The frame 1 of my improved planter is preferably made of iron pipe or tubes of suitable size and comprises a pair of longitudinally extending bars 2 the front ends of which are connected together by an inverted U-shaped bend 3 at the upper end of which is an attaching hook or clevis 4. Handles 5 have their lower ends secured on the bars 2 as at 6 and are connected together near their rear ends by a cross bar 7 and are sustained at the desired inclination by means of braces 8.

A pair of downwardly and rearwardly inclined standards 9 are secured to the rear ends of the bars 2 and are provided with bearings for the axle 10 of a roller 11. A shaft 12 is journaled in bearings 13 provided near the front ends of the bars 2. This shaft is provided, at a point midway between the bars 2 with a ground wheel 14 which is fixed to the shaft for rotation therewith, is provided with a relatively broad tread 15 and is also provided with a series of radially arranged drill openers 16 which are blades of suitable length and width, arranged transversely of the periphery of the wheel 14 and secured thereto by angle irons 14ª. The length of these drill openers exceeds the width of the tread of the wheel so that the drill openers project beyond opposite sides of the wheel. These drill openers may be of any suitable dimensions but, in practice, are preferably about nine inches long. A suitable number of drill opening blades are employed and they are suitably spaced apart, usually so as to open drills transversely across a cotton row and ten inches apart. On one end of the shaft 12 is a beveled gear 18. A hopper 19 is secured between the handles 5 and comprises a pair of side walls 20 and a pair of front and rear walls 21. The side walls are formed with circular portions 22 between their upper and lower ends and also with narrowed downwardly extending portions 24 below the circular portions, the front edges of the downwardly extending portions 24 being vertical and their rear edges being forwardly inclined. The front and rear walls 21 are secured between the side walls 20 by bolt rods 25 which pass through openings in lugs 26 with which the side walls are provided. These front and rear walls have oppositely curved intermediate portions 27 which coact with the circular portions 22 of the side walls to form a substantially cylindrical transversely extending chamber 28 below the throat 29 of the hopper, the lower portions of the front and rear walls being alined with the front and rear edges of the downward extensions 24 of the side walls 20 and coacting therewith to form a seed spout 30 which projects downwardly from the said chamber 28.

At the centers of the circular portions 22 of the side walls are bearings 31 for the shaft 32 of a seed dropping drum 33 which is provided with longitudinal peripheral seed slots or grooves 34 and with adjustable slides 35 to vary the effective capacity of said seed slots or grooves to enable each slot or groove to hold any desired number or quantity of cotton seed. On one end of the seed dropping drum shaft 32 is a beveled gear 40. A longitudinally arranged shaft 41 is mounted in bearings 42 which are secured to one of the bars 2. This shaft has a beveled gear 43 at its front end which engages the gear 18 and is provided with a similar gear 44, at its rear end which engages the gear 40. These gears are so timed and the grooves or slots 35 of the seed dropping drum and the drill openers 16 of the ground wheel 14 are so arranged that while one of the drill openers is on the lower side of the ground wheel in the act of opening a drill, one of the seed slots or grooves 34 of the seed dropping drum will also be on the lower side of the drum and immediately above the drill last opened by the wheel 14 and, hence, the seed are dropped directly into the drills in succession after the drills are opened. A revoluble seed stirrer 45 has its shaft 46 mounted in bearings in the sides of the hopper and this seed stirrer is driven by an endless sprocket chain 53 and sprocket wheels 54 and 55. The slides are provided with radial inwardly extending grooved arms 56, the grooves of which are engaged by tangential cam flanges 57 on disks 58 which are loosely mounted on the shaft 32. These disks bear against the outer sides of heads 59 in the bore of the drum and are connected together by bolts 60 which operate in slots 61 in the disks and which are concentric with the said shaft. After first loosening the winged nuts 62 on the bolts, the disks may be turned to cause the cam flanges to adjust the slides as desired, and the winged nuts should be then tightened to receive the slides in adjusted position.

A coverer, hoe or board 50 is secured to the lower ends of a pair of spring standards 51, the upper ends of which are turned forward and bolted to the under sides on the bars 2 at a point a suitable distance to the rear of the hopper as at 52. This board and its spring standards serve to cover the drills after the seeds are dropped therein and the roller 11 then passes over the drills so as to compress the ground around the seeds and thus insure the thorough planting of the crop.

In the operation of my improved planter, the same is run lengthwise on the cotton rows, behind a suitable drag which levels off the top of the rows and the planter by reason of the construction of its ground wheel and the peculiar construction of its seed dropping mechanism, plants the seeds in short drills across the tops of the rows and at suitable regular distances apart so that plants of cotton are insured at all the hills and the operation of chopping out the cotton or first hoeing the same is rendered unnecessary as the superfluous plants which come up can be turned by means of plows to the spaces between the rows, thus greatly facilitating and reducing the cost of cultivating the crop.

I claim:—

A cotton planter of the class described comprising a frame, a ground wheel mounted in the frame, a hopper carried by the frame and arranged in rear of the ground wheel, drill openers on the periphery of the ground wheel, a seed dropping element mounted below the throat of the hopper, a spout extending down from the hopper below the seed dropping element, gearing connecting the ground wheel and seed dropping element to actuate the latter, a coverer connected to the frame, and a roller mounted in rear of the coverer.

In testimony whereof I affix my signature in presence of two witnesses.

DONNIE C. GRAMLING.

Witnesses:
A. P. KNOERR,
R. F. COPPAGE.

---

Copies of this patent may be obtained for five cents each, by addressing the "Commissioner of Patents, Washington, D. C."